United States Patent

Fukumura et al.

[11] Patent Number: 6,161,641
[45] Date of Patent: Dec. 19, 2000

[54] ENGINE BRAKE CONTROL SYSTEM FOR VEHICLE

[75] Inventors: Tomohiro Fukumura; Hajime Kosaka, both of Kanagawa, Japan

[73] Assignee: Nissan Motor Co., Ltd., Yokohama, Japan

[21] Appl. No.: 08/889,597

[22] Filed: Jul. 8, 1997

[30] Foreign Application Priority Data

Jul. 22, 1996 [JP] Japan ................................. 8-191855

[51] Int. Cl.⁷ ................................................ B60K 27/02
[52] U.S. Cl. ............................................ 180/197; 701/85
[58] Field of Search .......................... 180/197; 701/82, 701/84, 85, 70, 72, 86

[56] References Cited

U.S. PATENT DOCUMENTS

| | | | |
|---|---|---|---|
| 3,802,528 | 4/1974 | Leiber ...................................... | 180/197 |
| 4,696,380 | 9/1987 | Kita ......................................... | 192/4 A |
| 4,722,411 | 2/1988 | Ohashi et al. ........................... | 180/197 |
| 4,739,856 | 4/1988 | Inagaki et al. ........................... | 180/197 |
| 4,788,644 | 11/1988 | Inagaki ................................. | 364/426.03 |
| 4,917,208 | 4/1990 | Komoda ................................. | 180/197 |
| 4,951,773 | 8/1990 | Poirier et al. ........................... | 180/197 |
| 5,018,595 | 5/1991 | Hara et al. ............................... | 180/197 |
| 5,022,483 | 6/1991 | Tsuyama et al. ........................ | 180/197 |
| 5,072,995 | 12/1991 | Kawamura et al. ..................... | 303/100 |
| 5,082,081 | 1/1992 | Tsuyama et al. ........................ | 180/197 |
| 5,092,435 | 3/1992 | Sone et al. ............................... | 180/197 |
| 5,107,948 | 4/1992 | Yamamoto .............................. | 180/197 |
| 5,161,432 | 11/1992 | Matsumoto et al. ....................... | 74/866 |
| 5,163,530 | 11/1992 | Nakamura et al. ..................... | 180/197 |
| 5,193,061 | 3/1993 | Tsuyama et al. .................. | 364/426.02 |
| 5,193,888 | 3/1993 | Okazaki et al. ........................... | 303/93 |
| 5,245,542 | 9/1993 | Itoh et al. ........................... | 364/426.02 |
| 5,262,950 | 11/1993 | Nakayama ......................... | 364/424.05 |
| 5,281,008 | 1/1994 | Kawamura et al. .................... | 303/100 |
| 5,313,922 | 5/1994 | Demel ................................... | 123/333 |
| 5,329,453 | 7/1994 | Tsuyama et al. .................. | 364/426.02 |
| 5,369,586 | 11/1994 | Bridgens ............................ | 364/426.03 |
| 5,390,116 | 2/1995 | Hayafune ............................. | 364/424.1 |
| 5,415,600 | 5/1995 | Mochizuki et al. ....................... | 477/10 |
| 5,428,531 | 6/1995 | Hayafune ............................. | 364/424.1 |
| 5,431,241 | 7/1995 | May et al. .............................. | 180/197 |
| 5,521,594 | 5/1996 | Fukushima ............................. | 340/901 |
| 5,586,953 | 12/1996 | Abo .......................................... | 477/47 |
| 5,782,221 | 7/1998 | Woldt .................................... | 123/436 |
| 5,857,754 | 1/1999 | Fukami et al. .......................... | 303/146 |

FOREIGN PATENT DOCUMENTS

3-194138  8/1991  Japan .
5-155277  6/1993  Japan .

*Primary Examiner*—Kevin Hurley
*Assistant Examiner*—Andrew J. Fischer
*Attorney, Agent, or Firm*—Foley & Lardner

[57] ABSTRACT

A control system for controlling engine braking effect of a vehicle includes a sensor section, an actuator section and a controller section at least. The sensor section includes sensors, such as longitudinal and lateral acceleration sensors or wheel speed sensors, for determining a vehicle operating variable indicative of slipperiness of a road surface. The actuator section varies a manipulated variable, such as a throttle opening degree, an air fuel ratio or a gear ratio, of an engine and transmission system to control the engine braking torque in response to a control signal. The controller section decreases the engine braking torque by varying the manipulated variable as the road surface becomes more slippery.

23 Claims, 5 Drawing Sheets

ENGINE BRAKE CONTROL SYSTEM FOR VEHICLE

BACKGROUND OF THE INVENTION

The present invention relates to engine brake control system and process for controlling a power unit of a vehicle adequately during an engine braking operation in which a driver decreases a throttle opening by releasing an accelerator pedal and thereby applies engine brake.

When the driver releases the accelerator pedal to apply the engine brake, some conventional systems are arranged to perform a fuel cutoff control for cutting off fuel supply to part or all of cylinders of the engine during such an engine braking operation, in order to improve the fuel economy.

In this type of the engine brake control system utilizing the fuel cutoff during the engine braking operation, an excess of engine braking effect might cause slipping or locking of the drive wheels of the vehicle on a low friction road or a curved road.

In this case, the vehicle might exhibit such unnatural behavior inconsonant with a driver's steering wheel operation, as to deteriorate the drive feeling and the stability of the vehicle.

Furthermore, in systems arranged to prolong the fuel cutoff period and improve the fuel efficiency by putting a hydrodynamic drive such as a torque converter in a lockup state of a direct mechanical coupling between input and output elements, the possibility of engine stall is undeniably associated with the wheel locking.

A conventional control system as disclosed in Japanese Patent Provisional Publication No. 3(1991)-194138 is arranged to weaken the engine brake to prevent unstable vehicle behavior by stopping the fuel cutoff stepwise in case of wheel slipping or locking.

Another conventional control system as disclosed in Japanese Patent Provisional Publication No. 5(1993)-155277 is arranged to predict engine stall by detecting an abrupt decrease of the engine speed, and change the torque converter from the lockup state to a converter state to prevent the engine stall.

However, the former conventional system must interrupt the fuel cutoff control to prevent wheel lock and unstable vehicle behavior at the cost of the advantage of the fuel cutoff control in the fuel economy.

The latter conventional technique must sacrifice the fuel advantage of the lockup by reducing the lockup time to prevent engine stall. Furthermore, the cancellation of lockup causes a reduction of the fuel cutoff time, resulting in further deterioration of the fuel consumption.

SUMMARY OF THE INVENTION

It is therefore an object of the present invention to provide a control system and a process capable of preventing unstable vehicle behavior due to wheel locking and engine stall without resorting to the interruption of fuel cutoff or the cancellation of lockup.

According to the present invention, a control system or process for controlling engine brake of a vehicle, comprises a first section or step for monitoring a degree of slipperiness of a road surface and a second section or step for decreasing an engine braking torque with increase in the degree of slipperiness.

In a vehicle in which the fuel supply to at least one cylinder of an engine is cut off to improve the fuel consumption when a driver applies engine brake by releasing an accelerator pedal and thereby decreasing an engine throttle opening degree, the control system or process according to the present invention can prevent an excess of the engine braking effect due to the fuel cutoff operation even in a slippery vehicle running situation as on a slippery or curved road. Therefore, the control system or process of the present invention can prevent undesired slipping or locking of the driving wheels, the occurrence of unnatural vehicle behavior, and engine stall. The present invention can achieve these effects without interrupting the fuel cutoff control, and/or the lockup control of the torque converter or other hydrodynamic drive.

DETAILED DESCRIPTION OF THE INVENTION

Figure 1:
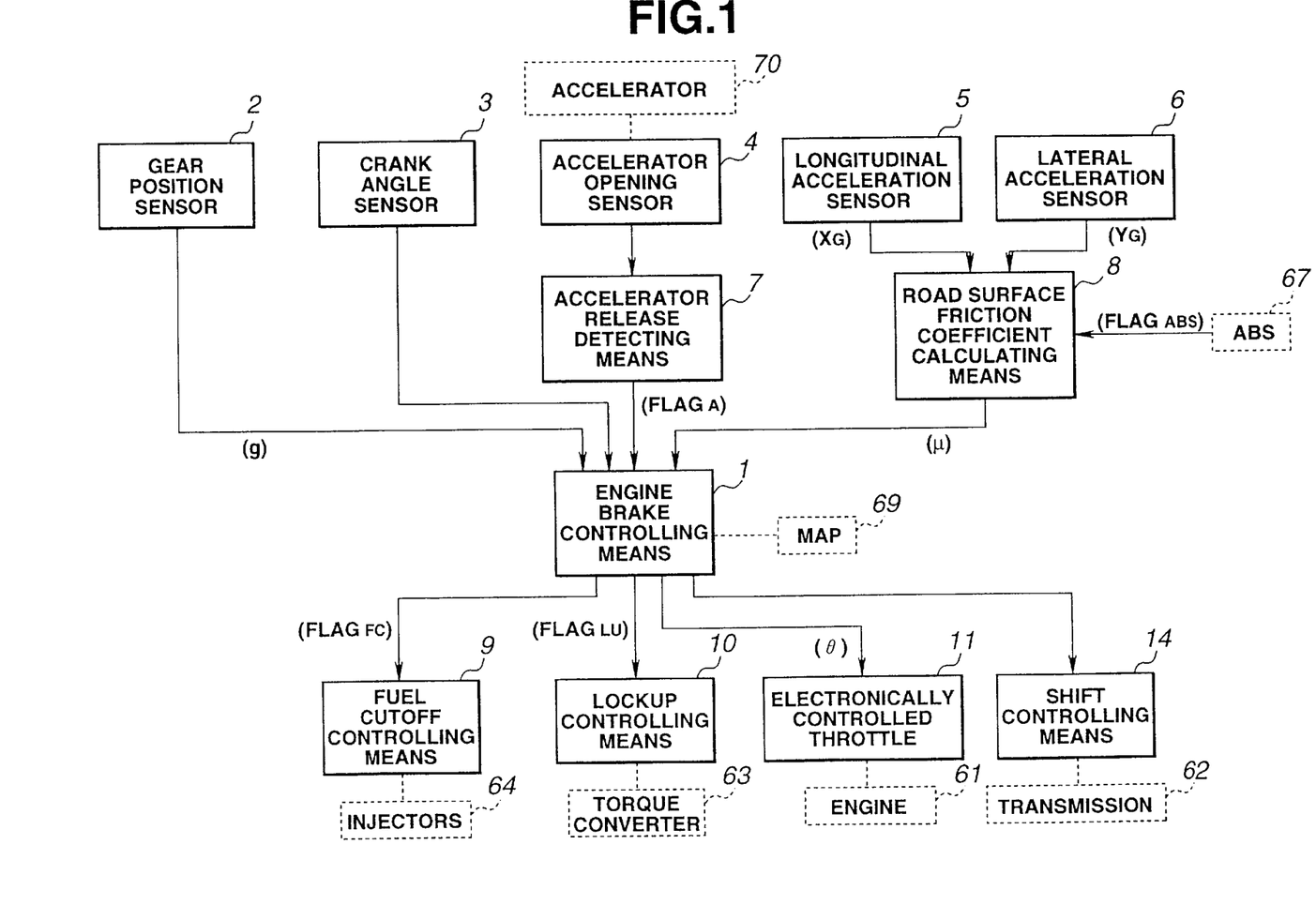
FIG. 1 is a block diagram showing a control system according to a first embodiment of the present invention.
Figure 2:
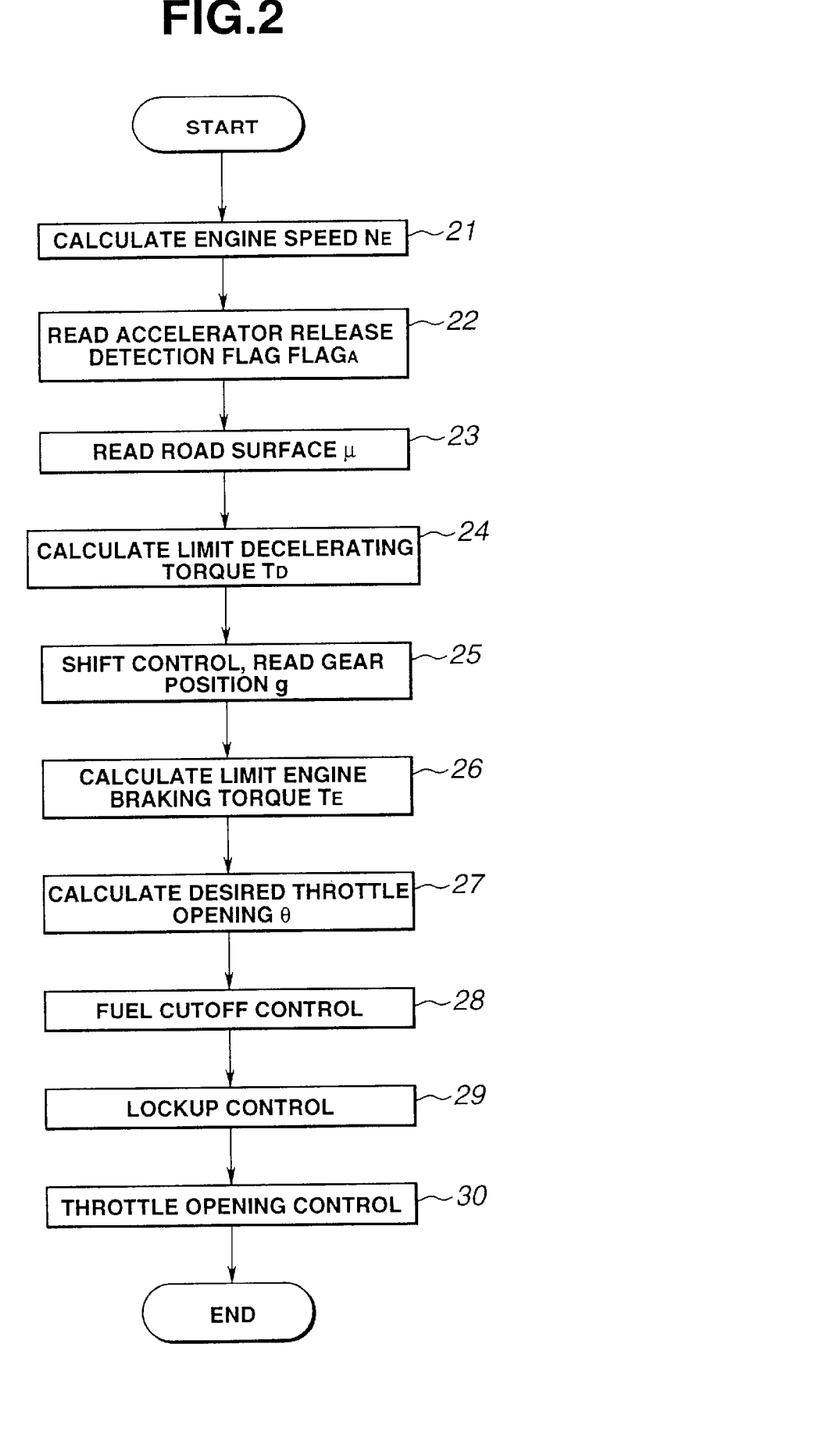
FIG. 2 is a flow chart of a control program performed by an engine brake controlling means of the control system shown in FIG. 1.

FIGS. 1 and 2 show a control system according to a first embodiment of the present invention.

The control system shown in FIG. 1 includes a sensor or input section for sensing various vehicle operating conditions and collecting input information, an actuator or output section having one or more actuators for varying one or more manipulated variables to control an engine braking torque in response to a control signal, and a controller section for controlling the engine brake by producing the control signal.

In a motor vehicle of this embodiment, the output of an engine 61 is controlled by a throttle actuator unit 11 which, in this example, is an electronically controlled throttle valve unit capable of controlling the throttle opening degree independently of the driver's accelerator pedal operation. The output torque of the engine 61 is transmitted through a lockup torque converter 63 to a multi-speed automatic transmission 62 (as distinguished from a continuously variable transmission), and the automatic transmission 62 changes an output speed relative to an input speed according to a gear ratio corresponding to a selected speed, and delivers the output rotation toward the driving wheels of the vehicle.

The controller section of this example comprises an engine brake controlling means 1, and the sensor section comprises a group of vehicle operating condition sensing devices (such as devices 2, 3, 4, 5 and 6) for collecting information items to be input to the engine brake controlling means 1. In the example shown in FIG. 1, the sensor section includes a first device in the form of a gear position sensor 2, a second device in the form of a crank angle sensor 3, a third device in the form of an accelerator opening sensor 4, and a fourth device for producing a signal representing a vehicle operating variable indicative of a frictional road surface condition. In this example, there are provided, as the fourth device, a longitudinal acceleration sensor 5 and a lateral acceleration sensor 6.

The gear position sensor 3 of the sensor section senses a selected speed (or selected gear position) of the automatic transmission 62 of the vehicle, and supplies an input information signal indicative of the sensed condition to the engine brake controlling means 1.

The crank angle sensor 2 responds to the rotation of the engine output shaft in the form of the crank shaft, and sends a pulse signal representing the engine speed, to the engine brake controlling means 1.

The accelerator opening sensor 4 of this example senses the position of an accelerator pedal 70 of the vehicle with a sensing device such as a potentiometer, and produces a signal representing the sensed accelerator opening (or accelerator position).

An accelerator release detecting means 7 receives and monitors the signal from the accelerator opening sensor 4 to detect a driver's releasing operation of the accelerator pedal 70, and sets a condition signal in the form of an accelerator release detection flag $FLAG_A$ to one when the accelerator pedal 70 is released by the driver. In this example, the controller section comprises the accelerator release detecting means 7 as well as the engine brake controlling means 1.

The longitudinal acceleration sensor 5 and lateral acceleration sensor 6 are mounted at the center of gravity of the vehicle, and adapted to sense the longitudinal acceleration $X_G$ and lateral acceleration $Y_G$ of the vehicle, respectively.

A road surface friction coefficient calculating means 8 receives the longitudinal acceleration $X_G$ and lateral acceleration $Y_G$ sensed by the sensors 5 and 6. The friction coefficient calculating means 8 further receives a condition signal in the form of an anti-skid control flag $FLAG_{ABS}$ from an anti-skid brake control system 67. The anti-skid control flag $FLAG_{ABS}$ is set to one during the anti-skid control operation. In dependence on the value of the anti-skid control flag $FLAG_{ABS}$, the friction coefficient calculating means 8 calculates a friction coefficient $\mu$ of a road surface from the longitudinal and lateral accelerations $X_G$ and $Y_G$ in the following manner. In this example, the controller section further comprises the road surface friction coefficient calculating means 8.

During the anti-skid control, there arises a frictional force between the wheel and the road surface. Therefore, when the anti-skid control flag $FLAG_{ABS}$ is one indicating the working period of the anti-skid control, the friction coefficient calculating means 8 calculates the road surface friction coefficient $\mu$ by using a friction circle of the longitudinal and lateral accelerations $X_G$ and $Y_G$ of the vehicle. That is;

$$\mu = \sqrt{X_G^2 + Y_G^2} \tag{1}$$

When the anti-skid control flag $FLAG_{ABS}$ is zero indicating that the anti-skid control is out of operation, the friction coefficient $\mu$ is held equal to the result of calculation of the equation (1) at the time when the anti-skid flag $FLAG_{ABS}$ is changed from one to zero.

By using the signal from the gear position sensor 2, the signal from the crank angle sensor 3, the signal (the accelerator release detection flag $FLAG_A$) from the accelerator release detecting means 7, and the friction coefficient $\mu$ calculated by the road surface friction coefficient calculating means 8, the engine brake controlling means 1 of the controller section carries out a control program shown in FIG. 2 to achieve an intended engine brake control through a fuel cutoff controlling means 9, a lockup controlling means 10, the electronically controlled throttle valve unit 11 and a shift controlling means 14.

At step 21 of FIG. 2, the engine brake controlling means 1 calculates the engine speed $N_E$ (in terms of the number of revolutions per unit time) from the pulse repetition period of the pulse signal produced by the crank angle sensor 3.

At step 22, the control system reads the accelerator release detection signal $FLAG_A$ of the accelerator release detecting means 7.

At step 23, the engine brake controlling means 1 reads the road surface friction coefficient $\mu$ calculated by the friction coefficient calculating means 8.

At step 24, the engine brake controlling means 1 uses the road surface friction coefficient $\mu$ and a wheel load $W_R$, and thereby calculates a limit decelerating torque $T_D$ which is possible under these vehicle operating conditions, according to the following equation.

$$T_D = W_R \cdot \mu \tag{2}$$

The sign is plus on the deceleration side (engine braking side), and the quantity $T_D$ is positive.

Figure 3:
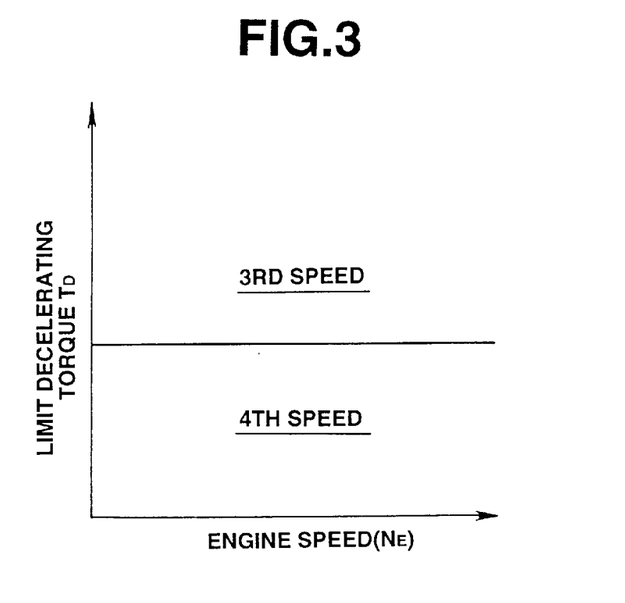
FIG. 3 is a graph showing an engine braking shift pattern for an automatic transmission used in the control system of FIG. 1.

At step 25, the engine brake controlling means 1 determines a desired engine braking gear position g to achieve the limit decelerating torque $T_D$, from the limit decelerating torque $T_D$ and the engine speed $N_E$ according to a map as shown in FIG. 3, and sends a shift command signal to the shift controlling means 14 to shift the automatic transmission toward the gear position g, and reads the gear position g sensed by the sensor 2.

As shown in FIG. 3, the control system shifts the gear position to a higher speed and thereby decreases the engine brake as the limit decelerating torque $T_D$ becomes smaller. Therefore, on a slippery road surface having a low friction coefficient, the limit decelerating torque $T_D$ given by the equation (2) becomes smaller and the control system decreases the engine brake by upshifting. As a result, the control system can prevent the fuel cutoff (or shutoff) operation during engine braking from causing the driving wheels of the vehicle to slip or lock.

At step 26, the engine brake controlling means 1 calculates a gear ratio ng from the gear position g, and calculates a limit engine braking torque $T_E$ corresponding to the limit decelerating torque $T_D$, by dividing the limit decelerating torque $T_D$ by the gear ratio ng. That is;

$$T_E = T_D / ng \tag{3}$$

At step 27, the engine brake controlling means 1 determines a desired throttle opening degree, θ in the following manner. In this example, the throttle opening degree is a manipulated variable to control the engine braking effect.

Figure 4:
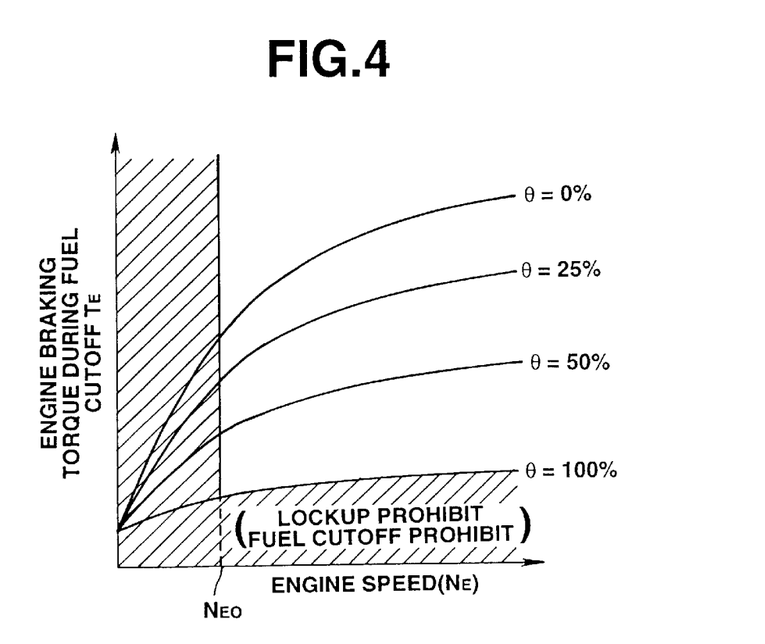
FIG. 4 is a graph showing an engine performance characteristic during a fuel cutoff operation, with a throttle opening degree as a parameter.

FIG. 4 shows, as an example, a family of engine performance curves of the engine 61 in a predetermined fuel cutoff operating state. By using a map corresponding to the engine performance curves exemplified in FIG. 4, the engine brake controlling means 1 determines a minimum feasible engine braking torque Tmin and a maximum feasible engine braking torque Tmax. The minimum engine braking torque Tmin is an engine braking torque $T_E(100\%, N_E)$ at full throttle where the throttle valve is fully open and the throttle opening degree, θ is 100%. The maximum braking torque Tmax is an engine braking torque $T_E(0\%, N_E)$ at fully closed throttle where the throttle valve is fully closed and θ is 0%.

Then, the engine brake controlling means 1 compares the limit engine braking torque $T_E$ corresponding to the road surface friction coefficient μ with the minimum engine braking torque Tmin=$T_E(100\%, N_E)$, and sets a condition signal in the form of an engine brake controllability flag $FLAG_E$ to one or zero according to the result of the comparison. When the limit engine braking torque $T_E$ is equal to or greater than the minimum engine braking torque Tmin, the control system sets an engine brake controllability flag $FLAG_E$ to one since the control system can attain the limit engine braking torque $T_E$ by the throttle operation. When, on the other hand, the limit engine braking torque $T_E$ is smaller than the minimum engine braking torque Tmin, the control system sets the engine brake controllability flag $FLAG_E$ to zero since the control system cannot attain the limit engine braking torque $T_E$ by the throttle operation and the control system cannot eliminate wheel locking.

When the limit engine braking torque $T_E$ is equal to or greater than the minimum engine braking torque Tmin=$T_E$(100%, $N_E$), and equal to or smaller than the maximum engine braking torque Tmax=$T_E(0\%, N_E)$, the control system determines the desired throttle opening degree, θ ($T_E$, $N_E$) from the limit engine braking torque $T_E$ and the engine speed $N_E$ by using the map of FIG. 4 because the control system can attain the limit engine braking torque $T_E$ accurately by the throttle operation.

When $T_E$>Tmax, the control system sets the desired throttle opening degree, θ equal to 0% since it is not possible to decrease the throttle opening degree below 0% because of hardware limitations.

When $T_E$<Tmin, the limit engine braking torque $T_E$ is not attainable by the throttle operation and the wheel locking is unavoidable. Therefore, the control system makes the engine brake ineffective by inhibiting the fuel cutoff control and the lockup control of the following steps with the engine brake flag $FLAG_E$=0, and sets the desired throttle opening degree, θ equal to a predetermined constant value α for putting the engine at an idling state.

At step 28, the engine brake controlling means 1 sets a condition signal in the form of a fuel cutoff flag $FLAG_{FC}$ to one (to enable the fuel cutoff control) and commands the fuel cutoff controlling means 9 to perform the fuel cutoff control operation during the engine braking by sending the fuel cutoff flag $FLAG_{FC}$ in the enabling signal state if the accelerator releasing operation is detected and the accelerator release detection flag $FLAG_A$ is set to one in a state in which the engine speed $N_E$ is equal to or higher than a preset value $N_{E0}$ (shown in FIG. 4), and the engine brake controllability flag $FLAG_E$ is one. If any one or more of these three conditions is absent, then the control system resets the fuel cutoff flag $FLAG_{FC}$ to zero (to disable the fuel cutoff control) and prohibits the fuel cutoff control operation during engine braking.

At step 29, like the fuel cutoff control, the engine brake controlling means 1 sets a condition signal in the form of a lockup flag $FLAG_{LU}$ value to one (to enable the lockup control) and commands the lock up controlling means 10 to perform the lockup operation of the torque converter 63 by sending the lockup flag $FLAG_{LU}$ of one if the engine speed $N_E$ is equal to or higher than the preset value $N_{E0}$ (shown in FIG. 4), the engine brake enabling flag $FLAG_E$ is one and the accelerator release detecting flag $FLAG_A$ is one indicating the detection of a releasing operation of the accelerator pedal 70. If any one or more of these three conditions is absent, then the control system resets the lockup flag $FLAG_{LU}$ to zero (to disable the lockup control) and prohibits the lock up operation to put the torque converter 63 to a converter state in which the direct mechanical coupling between the input and output elements of the torque converter 63 is broken off.

At step 30, the engine brake controlling means 1 sends a throttle control signal representing the desired throttle opening degree, θ calculated in the step 27, to the electronically controlled throttle valve unit 11 shown in FIG. 1, and thereby controls the actual throttle valve opening of the engine 61 to the desired throttle opening degree, θ.

The thus-constructed engine brake control system monitors the degree of slipperiness of the road surface on which the vehicle is running, in terms of the friction coefficient determines the limit engine braking torque $T_E$ from the road surface friction coefficient μ and the wheel load $W_R$, and determines the desired throttle opening degree, θ($T_E$, $N_E$) to provide an engine output torque corresponding to the limit engine braking torque by using the engine performance characteristic relationship (as shown in FIG. 4) during the fuel cutoff operation, and controls the actual throttle opening degree so as to reduce any deviation from the thus-determined desired throttle opening degree.

In this control system, therefore, as the road surface friction coefficient μ becomes lower (more slippery), the limit engine braking torque $T_E$ is decreased, and hence the throttle opening degree is increased.

As a result, even in slippery running situations as in a driving operation on a low friction road or a cornering operation, this control system can prevent the engine braking effect from being increased excessively by the fuel cutoff control, and prevent slipping and locking conditions of the driving wheels due to excessive engine brake. Furthermore, the control system can prevent the occurrence of unnatural vehicle behavior inconsonant with driver's steering wheel operation, and prevent the occurrence of engine stall.

In addition, the control system can achieve the above-mentioned effects without stopping the fuel cutoff control during engine brake, and without stopping the torque converter lockup control to improve the fuel economy by prolonging the fuel cutoff time. Therefore, the control system can prevent the occurrence of unstable vehicle behavior and engine stall without deteriorating the fuel consumption.

The longitudinal and lateral acceleration sensors are generally used in the anti-skid brake control system. Therefore, the control system according to this embodiment can evaluate the vehicle operating variable, such as the road surface friction coefficient μ, indicative of the road surface condition without adding expensive components to the anti-skid system.

In the state in which the limit engine braking torque $T_E$ is smaller than the minimum feasible engine braking torque Tmin =$T_E$(100%, $N_E$), and accordingly the engine brake exceeding the limit engine braking torque occurs no matter how the throttle is operated, the control system of this embodiment prohibits the fuel cutoff operation by resetting the fuel cutoff flag $FLAG_{FC}$ to the disabling state of zero and cancels the lockup of the torque converter 63 by resetting the lockup flag $FLAG_{LU}$ to the disabling state of zero. Therefore, the control system can prevent wheel locking and engine stall reliably.

In one practical example according to the first embodiment of the invention, the controller section comprises one or more onboard computers. In such a case, the engine controlling means 1 is connected with a memory section 69 as shown in FIG. 1 for storing the map of FIG. 4 and other required information items, and the engine controlling means 1 may comprise, as a main component, a processor section of an onboard computer, or the entire computer. In one practical example, as shown by broken line in FIG. 1, the fuel cutoff controlling means 9 is connected with a fuel supplying actuator 64 which, in this example, is a group of fuel injectors for the engine 61.

Figure 5:
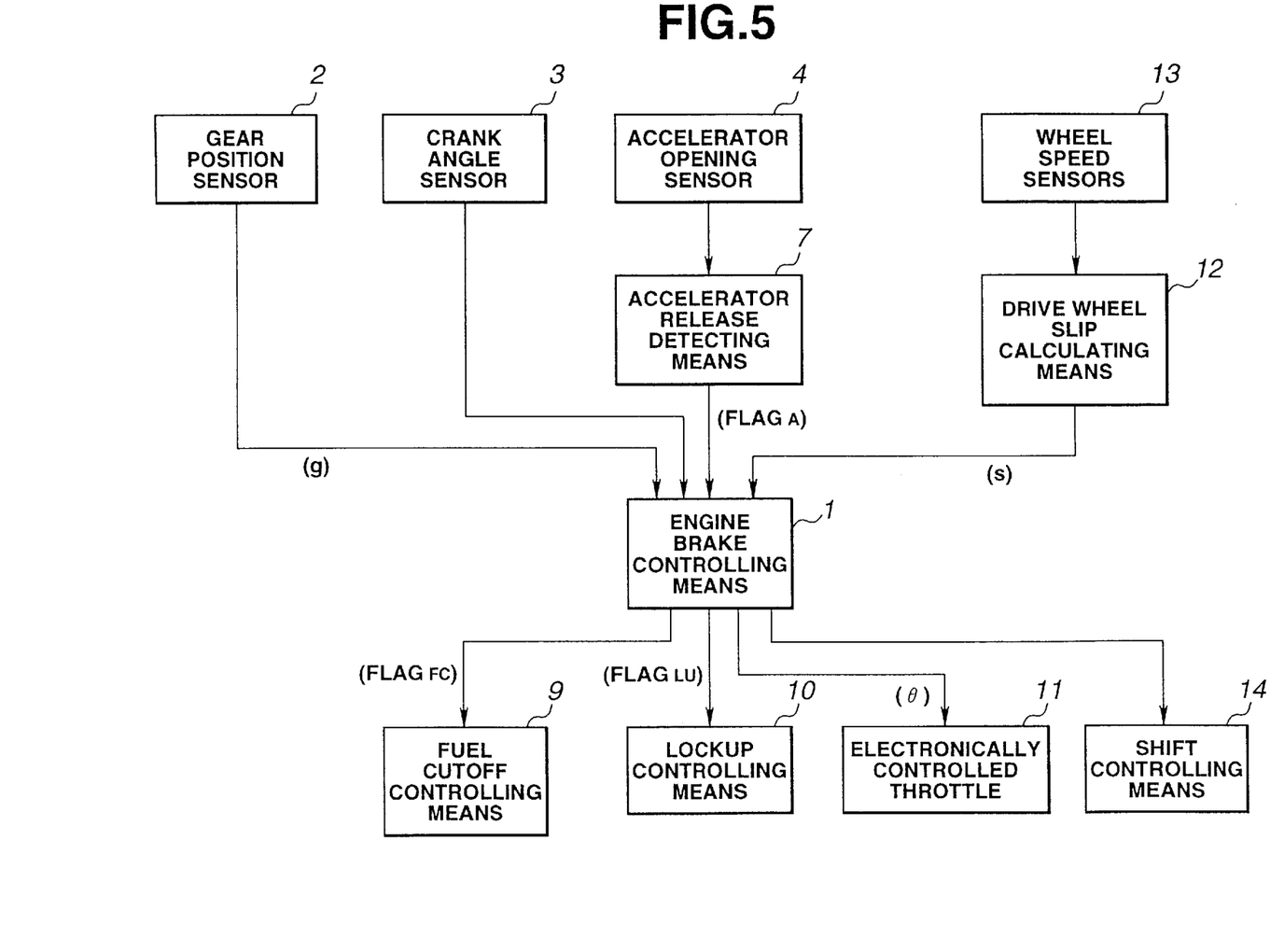
FIG. 5 is a block diagram showing a control system according to a second embodiment of the present invention.

FIG. 5 shows a second embodiment of the present invention. The first embodiment is arranged to judge the degree of slipperiness of the road surface by examining the road surface friction coefficient p and determine the desired throttle opening degree. In the second embodiment, by contrast, the control system judges the degree of slipperiness of the road surface from a drive wheel slip quantity.

In the example of FIG. 5, the road surface friction coefficient calculating means 8 of FIG. 1 is replaced by a drive wheel slip calculating means 12. A wheel speed sensor group 13 (serving as the fourth sensing device) senses individual wheel speeds VWi of all the wheels of the vehicle including the drive wheels and non-drive wheels.

The drive wheel slip calculating means 12 stores, as a vehicle body speed VI, the highest wheel speed among all the wheel speeds VWi, and determines p drive wheel speed VWR by averaging the wheel speeds of the left and right drive wheels. Then, the slip calculating means 12 determines a drive wheel slip quantity S by subtracting the vehicle body speed VI from the drive wheel speed VWR which is the average of the left and right drive wheel speeds. That is; S=VWR−VI. The drive wheel slip calculating means 12 supplies the thus-determined drive wheel slip quantity S to the engine brake controlling means 1. In this example, the driving side is plus, and the drive wheel slip quantity S is negative.

In addition to the drive wheel slip quantity S, the engine brake controlling means 1 of FIG. 5 receives the signal g of the gear position sensor 2, the signal of the crank angle sensor 3, and the accelerator release detection flag $FLAG_A$. In accordance with these input information items, the engine brake controlling means 1 performs an engine brake control similar to the engine brake control of the first embodiment by executing the control program as shown in FIG. 2.

In the second embodiment, the engine brake controlling means 1 determines the limit decelerating torque $T_D$ at the step 24 of FIG. 2 in the following manner. The engine brake controlling means 1 first determines a deviation $\Delta S = S - S^*$ between the drive wheel slip quantity S and a desired slip quantity $S^*$ (negative) which is an allowable limit value of the drive wheel slip quantity during engine braking (instead of reading the friction coefficient at the 23), and calculates the limit decelerating torque $T_D$ from the slip deviation AS by using the following equation (4) substituting for the equation (2).

$$T_D = \{K_P + (K_I/S)\} \cdot \Delta S \quad (4)$$

where $K_P$ is a proportionality constant (or proportional gain), $K_I$ is an integration constant (integral gain), and s is a Laplace operator (or an complex variable used in the Laplace transform). In this example, the desired slip quantity $S^*$ is a predetermined negative constant.

The control system of the second embodiment can readily judge the degree of slipperiness of the road surface from the drive slip quantity S even when the vehicle is not equipped with the anti-skid brake control system.

In either of the first and second embodiments, the control system can further ensure the effects by controlling the air fuel mixture ratio to the fueled cylinder or cylinders to which the fuel supply is continued during the fuel cutoff control.

In this case, the engine brake controlling means 1 calculates the desired throttle opening degree, θ at step 27 in the following manner.

By using the map corresponding to the engine performance curves, exemplified in FIG. 4, of the engine in the fuel cutoff state, the control system determines the maximum feasible engine braking torque Tmax which is an engine braking torque $T_E(0\%, N_E)$ when the throttle valve is fully closed and θ is 0% as in the preceding embodiments.

Then, by using a map corresponding to engine performance curves of the engine in the fuel cutoff operation in which the fuel is supplied only to one cylinder of the engine at the full throttle opening degree of 100%, the engine brake controlling means 1 determines the engine braking torque obtained when the air fuel ratio to that cylinder is set equal to a normal value of 14, and sets the minimum feasible engine braking torque Tmin equal to the thus-determined engine braking torque.

Then, the control system compares the limit engine braking toque $T_E$ corresponding to the road surface friction coefficient μ or the drive wheel slip quantity S, with the minimum engine braking torque Tmin=$T_E(100\%, N_E)$, and sets the engine brake controllability flag $FLAG_E$ to one or zero according to the result of the comparison. When the limit engine braking torque $T_E$ is equal to or greater than the minimum engine braking torque Tmin, the control system sets the engine brake controllability flag $FLAG_E$ to one since the control system can attain the limit engine braking torque $T_E$ by the throttle operation. When, on the other hand, the limit engine braking torque $T_E$ is smaller than the minimum engine braking torque Tmin, the control system sets the engine brake controllability flag $FLAG_E$ to zero since the control system cannot attain the limit engine braking torque $T_E$ by the throttle operation and the control system cannot eliminate wheel locking.

When the limit engine braking torque $T_E$ is equal to or greater than the minimum engine braking torque Tmin, and equal to or smaller than the maximum engine braking torque Tmax=$T_E(0\%, N_E)$, the control system determines the desired throttle opening degree, θ ($T_E, N_E$) from the limit engine braking torque $T_E$ and the engine speed $N_E$ by using the map of FIG. 4 because the control system can attain the limit engine braking torque $T_E$ accurately by the throttle operation.

When $T_E$>Tmax, the control system sets the desired throttle opening degree, θ equal to 0%.

When $T_E$<Tmin, the limit engine braking torque $T_E$ is not attainable by the throttle operation and the wheel locking is unavoidable. Therefore, the control system sets the desired throttle opening degree, 0 equal to 100% to minimize the engine brake.

Figure 6:
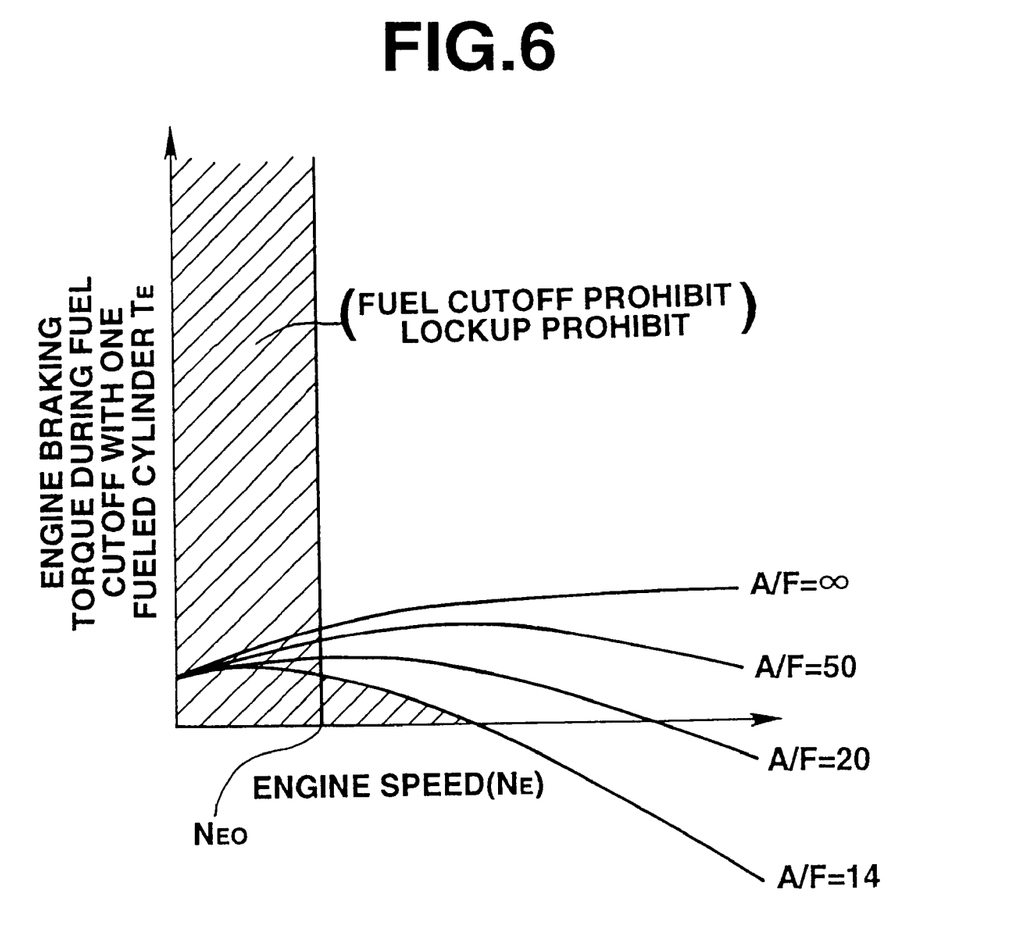
FIG. 6 is a graph showing an engine performance characteristic during a fuel cutoff operation, with an air fuel ratio for a fueled cylinder as a parameter.

Then, by using the map based on engine performance curves, as shown in FIG. 6, of the engine in the fuel cutoff state in which the fuel is supplied only to one cylinder, the control system determines, from the limit engine braking torque $T_E$ and the engine speed $N_E$, a desired air fuel ratio A/F to obtain an engine torque corresponding to the limit engine braking torque $T_E$.

At step 28, the control system sets the fuel cutoff flag $FLAG_{FC}$ to one to enable the fuel cutoff and commands the fuel cutoff controlling means 9 to perform the fuel cutoff control operation during the engine braking by sending the fuel cutoff flag $FLAG_{FC}$ value of one if the engine speed $N_E$ is equal to or higher than the preset value $N_{E0}$ (shown in FIG. 4), the engine brake controllability flag $FLAG_E$ is one and the accelerator release detection flag $FLAG_A$ is one as a result of detection of a releasing operation of the accelerator pedal 70. If any one or more of these three conditions is absent, then the control system resets the fuel cutoff flag $FLAG_{FC}$ to zero and prohibits the fuel cutoff control operation during engine braking.

This fuel cutoff control is substantially the same as that of the preceding embodiments. In this example, however, the control system further performs an air fuel ratio control at step 28 in the following manner.

When the fuel cutoff flag $FLAG_{FC}$ is one (that is, in the fuel cutoff enabling signal state), and the fuel cutoff control is in progress, the control system controls the actual air fuel ratio for the fueled single cylinder to which the fuel supply is not cut off, to the desired air fuel ratio A/F determined from the map of FIG. 6.

As shown in FIG. 6, the control system decreases the amount of the engine braking by decreasing the air fuel ratio to the fueled cylinder when the road surface is slippery, hence the friction coefficient $\mu$ is low or the drive wheel slip quantity S is large, and the limit engine braking torque $T_E$ is small. By adding such an air fuel ratio control, the control system can control the engine output torque more reliably to a value corresponding to the limit engine braking torque. In this case, the control system controls the engine braking torque by varying at least two manipulated variables, the throttle opening and the air fuel ratio, with at least two actuators which are the electronically controlled throttle valve unit 11 and the fuel supplying actuator 64.

In the present invention, it is possible to integrate the engine brake controlling means 1, the accelerator release detecting means 7, the variable calculating means 8 or 12, the fuel cutoff controlling means 9, the lockup controlling means 10, and the shift controlling means 14 in a single computer module. In this case, it is possible to design the control system so that the controller section includes all these means, and the actuator section includes the fuel supplying actuator 64, the torque converter 63 (or a lockup actuator of the torque converter 63), the throttle valve unit 11 (or a throttle actuator of the unit 11), and the transmission 62 (or a shifting actuator of the transmission 62). Alternatively, one or more of the means 7, 8, 9, 10 and 14 may be formed as a separate computer module which is electrically connected with a computer module serving as the engine brake controlling means 1. In such a case, it is possible to arrange the control system so that the controller section includes the engine brake controlling means 1, the accelerator release detecting means 7 and the calculating means 8 or 12, and the actuator section includes the fuel cutoff controlling means 9, the lockup controlling means 10, the throttle unit 11, and the shift controlling means 14.

The control system according to the present invention controls the engine braking torque by varying any one or more of the manipulated variables including the throttle opening degree, the gear ratio and the air fuel ratio.

What is claimed is:

1. An engine brake control system in a vehicle in which fuel supply to a cylinder of an engine is cut off when a driver applies engine brake by releasing an accelerator pedal and thereby decreasing an engine throttle opening degree, the engine brake control system comprising:

an actuator section capable of varying an engine braking torque during execution of fuel cutoff; and a controller section monitoring a degree of slipperiness of a road surface, calculating, from the degree of slipperiness, a limit engine braking torque which decreases as the degree of slipperiness increases, and decreasing the engine braking torque with increase in the degree of slipperiness by controlling the engine braking torque to a value corresponding to the limit engine braking torque by controlling the actuator.

2. An engine brake control system according to claim 1 wherein the control system comprises:

the actuator section varying the engine braking torque in response to a control signal;

a sensor section for sensing a vehicle operating condition to determine the degree of slipperiness; and the controller section controlling the engine braking torque during deceleration by producing the control signal, calculating a vehicle operating variable indicative of the degree of slipperiness from the vehicle operating condition, calculating the limit engine braking torque from the vehicle operating variable and decreasing the engine braking torque during deceleration in dependence on the limit engine braking torque determined from the operating variable.

3. An engine brake control system according to claim 2 wherein the actuator section comprises a drive system including the engine of the vehicle and a transmission of the vehicle, and an actuator varying a manipulated variable which is a condition of the drive system.

4. An engine brake control system according to claim 3 wherein the vehicle operating variable is a road surface friction coefficient, and the controller section is configured to calculate the road surface friction coefficient in accordance with a sensed longitudinal acceleration of the vehicle and a sensed lateral acceleration of the vehicle and to decrease the engine braking torque with decrease in the friction coefficient.

5. An engine brake control system according to claim 3 wherein the controller section is configured to determine the vehicle operating variable indicative of the degree of slipperiness in accordance with a sensed wheel slip quantity.

6. An engine brake control system according to claim 3 wherein the manipulated variable is the throttle opening degree of the engine of the vehicle, and the controller section is configured to decrease the engine braking torque by increasing the throttle opening degree of the engine.

7. An engine brake control system according to claim 3 wherein the manipulated variable is a gear ratio of the transmission, and the controller section is configured to decrease the engine braking torque by shifting the transmission of the vehicle to a higher speed.

8. An engine brake control system according to claim 3 wherein the manipulated variable is an air fuel ratio of the engine, and the controller section is configured to decrease the engine braking torque by decreasing the air fuel ratio for a fueled cylinder of the engine to which the fuel supply is continued during a fuel cutoff operation.

9. An engine brake control system according to claim 3 wherein the controller section is configured to determine a limit engine braking torque from the vehicle operating variable, to determine a desired value of the manipulated variable for providing an engine output torque corresponding to the limit engine braking torque, by using a predetermined engine performance characteristic of the engine in the fuel cutoff operation, and to control the manipulated variable of the engine and transmission system to the desired value of the manipulated variable.

10. An engine control system according to claim 9 wherein the vehicle operating variable indicative of the degree of slipperiness is one of a road surface friction coefficient and a deviation between a sensed wheel slip quantity and a desired wheel slip quantity, and the manipulated viable is one of the throttle opening degree and an air fuel ratio for the engine.

11. An engine brake control system according to claim 10 wherein the controller section is configured to determine the limit engine braking torque from the friction coefficient and a wheel load, to determine a desired value of the throttle opening degree for providing an engine output torque corresponding to the limit engine braking torque, by using the engine performance characteristic of the engine in the fuel cutoff operation, and to control the throttle opening degree of the engine to the desired value of the throttle opening degree.

12. An engine control system according to claim 10 wherein the controller section is configured to determine the limit engine braking torque from the deviation between the sensed wheel slip quantity and the desired wheel slip quantity, to determine a desired value of the throttle opening degree for providing an engine output torque corresponding to the limit engine braking torque, by using the engine performance characteristic of the engine in the fuel cutoff operation, and to control the throttle opening degree to the desired value of the throttle opening degree.

13. An engine brake control system according to claim 10 wherein the controller section is configured to determine the limit engine braking torque from the friction coefficient and a wheel load, to determine a desired value of the air fuel ratio for providing an engine output torque corresponding to the limit engine braking torque, by using the engine performance characteristic of the engine in the fuel cutoff operation, and to control the air fuel ratio for a cylinder of the engine to the desired value of the air fuel ratio.

14. An engine brake control system according to claim 10 wherein the controller section is configured to determine the limit engine braking torque from the deviation between the sensed wheel slip quantity and the desired wheel slip quantity, to determine a desired value of the air fuel ratio for providing an engine output torque corresponding to the limit engine braking torque, by using the engine performance characteristic of the engine in the fuel cutoff operation, and to control the air fuel ratio for a cylinder of the engine to the desired value of the air fuel ratio.

15. An engine brake control system according to claim 10 wherein the controller section is configured to determine a minimum feasible engine braking torque by using the engine performance characteristic during the fuel cutoff operation, the minimum feasible engine braking torque is an engine braking torque in a fully open throttle condition in which the throttle opening degree is maximum, and the controller section is further configured to cancel a lockup state of a hydrodynamic drive unit of the engine and transmission system when the limit engine braking torque is smaller than the minimum feasible engine braking torque.

16. An engine brake control system according to claim 3 wherein the sensor section comprises one of a first sensor set comprising a longitudinal acceleration sensor sensing a longitudinal acceleration of the vehicle and a lateral acceleration sensor sensing a lateral acceleration of the vehicle, and a second sensor set comprising wheel speed sensors sensing wheel speeds of wheels of the vehicle, and the actuator section comprises an actuator varying one of a throttle opening degree, an air fuel ratio and a gear ratio.

17. An engine brake controlling process in a vehicle in which fuel supply to a cylinder of an engine is cut off when a driver applies engine brake by releasing an accelerator pedal and thereby decreasing an engine throttle opening degree, the engine brake controlling process comprising:

a first step for estimating a degree of slipperiness of a road surface;

a second step for decreasing an engine braking torque during deceleration with increase in the degree of slipperiness; and a third step for performing a fuel cutoff operation during an engine braking operation in a predetermined engine operating region:

wherein the first step comprises a first sub-step of determining an engine speed of the engine of the vehicle, a second sub-step of producing an accelerator release detection signal when an accelerator releasing operation is detected, a third sub-step of calculating a vehicle operating variable indicative of the degree of slipperiness and a fourth sub-step of calculating a limit decelerating torque in accordance with the vehicle operating variable, and the second step comprises a first sub-step of determining a gear ratio of a transmission of the vehicle, a second sub-step of calculating a limit engine braking torque in accordance with the limit decelerating torque and the gear ratio, a third sub-step of calculating a desired value of a manipulated variable in accordance with the limit engine braking torque and the engine speed, and a fourth sub-step of producing a control signal to control the manipulated variable to the desired value, the manipulated variable being a condition of an engine and transmission system of the vehicle.

18. A control system in a motor vehicle, comprising:

a sensor section sensing vehicle operating conditions and collecting information on an engine speed of the vehicle, an accelerator position of an accelerator of the vehicle, a gear ratio of a transmission of the vehicle, and a vehicle operating variable indicative of a frictional road surface condition;

an actuator section varying a manipulated variable to control an engine braking torque of the vehicle in response to a control signal; and a controller section receiving the information from the sensor section, determining a limit engine braking torque in accordance with the vehicle operating variable and the gear ratio, producing an accelerator release detection signal when the accelerator is released, determining a desired value of the manipulated variable in accordance with the limit engine braking torque and the engine speed, and controlling the engine braking torque during deceleration by producing the control signal representing the desired value of the manipulated variable when the accelerator release detection signal is present.

19. A control system according to claim 18:

wherein the sensor section comprises a first device producing a first input information signal representing the gear ratio of the transmission, a second device producing a second input information signal representing the engine speed, a third device producing a third input information signal representing a position of an accelerator pedal of the vehicle, and a fourth device producing a fourth input information signal for determining the vehicle operating variable indicative of the frictional road surface condition;

wherein the actuator section comprises a throttle actuator varying the manipulated variable that is a throttle opening degree of the engine in response to a throttle control signal, and a fuel supplying actuator cutting off fuel supply to at least one cylinder of the engine in case of a fuel cutoff signal being in a fuel cutoff enabling state; and wherein the controller section produces an accelerator release detection signal by monitoring the accelerator position, determines the vehicle operating variable indicative of the frictional road surface condition in accordance with the fourth input information signal, determines a limit decelerating torque in accordance with the vehicle operating variable, further determines the limit engine braking torque by dividing the limits decelerating torque by the gear ratio, obtains the desired value of the manipulated variable from the limit engine braking torque and the engine speed according to an engine performance characteristic relationship of an engine braking torque of the engine in a predetermined fuel cutoff state with respect to the engine speed and the manipulated variable, and setting the fuel cutoff signal to the enabling state if the accelerator release detection signal is present in a predetermined engine operating state.

20. An engine brake control system according to claim 3 wherein the controller section monitors a condition signal indicative of a condition of an anti-skid brake control of the vehicle, and calculates the vehicle operating variable indicative of the degree of slipperiness when the anti-skid brake control is in operation.

21. An engine brake control system according to claim 20 wherein the control system further comprises an anti-skid brake control system for controlling the degree of rotational wheel slip of the vehicle during braking, and the controller section receives, from the anti-skid brake control system, the condition signal indicative of the condition of the anti-skid brake control system, calculates the vehicle operating variable representing a road surface friction coefficient when the anti-skid brake control of the anti-skid brake control system is in operation, and holds the vehicle operating variable unchanged while the anti-skid brake control is out of operation.

22. An engine brake control system according to claim 1, wherein the controller section continues a fuel cutoff operation for cutting off the fuel supply during control of the engine braking torque to the value corresponding to the limit engine braking torque if the engine is in a predetermined engine operating region.

23. An engine brake control system according to claim 18, wherein the controller section continues a fuel cutoff operation for cutting off the fuel supply during control of the engine braking torque if the engine is in a predetermined engine operating region.

* * * * *